Oct. 28, 1969 D. W. CENTER 3,474,890
STUD FEEDER MECHANISM
Filed July 24, 1967
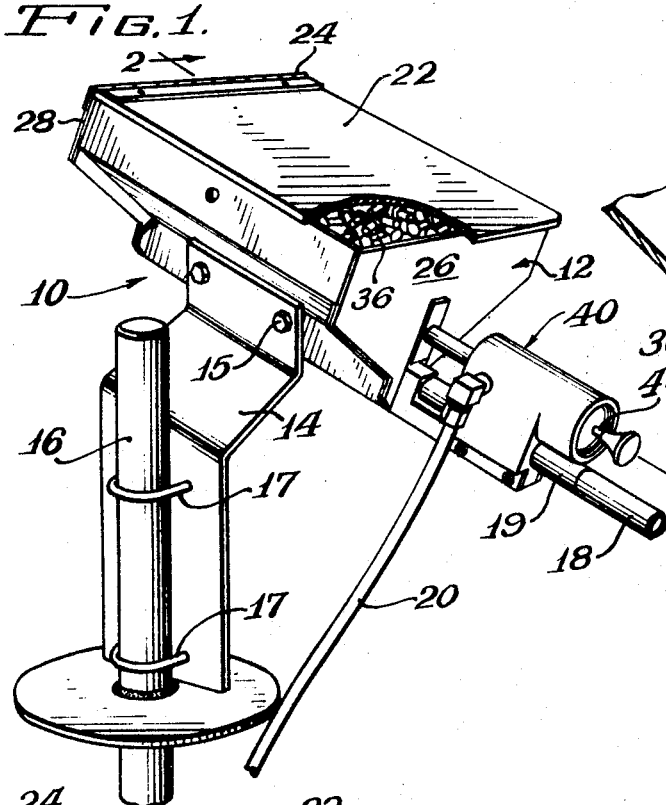
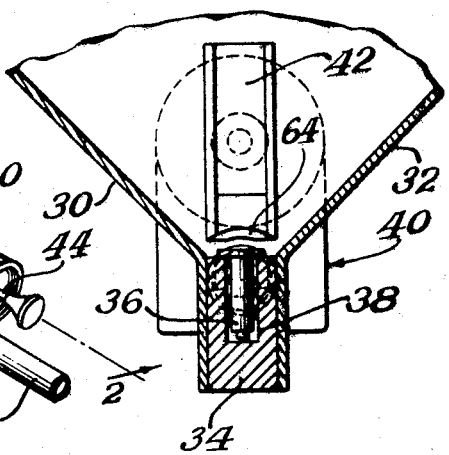
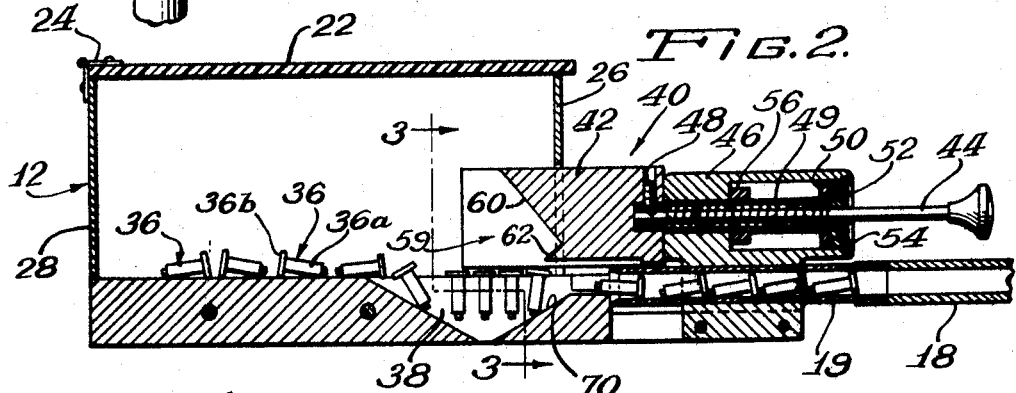
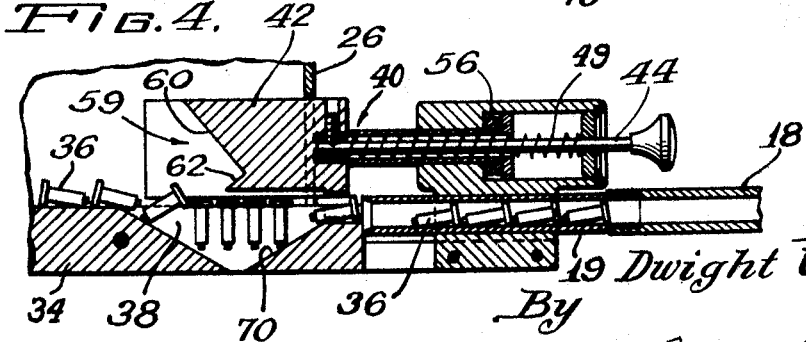
Inventor:
Dwight W. Center
By
Bair, Freeman & Molinare
Attys.

United States Patent Office
3,474,890
Patented Oct. 28, 1969

3,474,890
STUD FEEDER MECHANISM
Dwight W. Center, Loveland, Ohio, assignor, by mesne assignments, to Studebaker Corporation, a corporation of Delaware
Filed July 24, 1967, Ser. No. 655,654
Int. Cl. B65g 47/24
U.S. Cl. 198—33                                   5 Claims

ABSTRACT OF THE DISCLOSURE

A tire stud feeding mechanism comprising a hopper adapted to receive a plurality of studs disposed in random fashion therein. The studs, each of which has a shank portion and an enlarged head portion, are received in an elongated slot in the bottom downwardly sloping portion of the hopper. Agitating means are provided in the hopper for aligning the studs in the elongated slot with the shanks extending downwardly into the slot. The forward end of the hopper is provided with a cam track for tripping the studs head first into conduit means which conduct the studs to a place of use.

SUMMARY OF THE INVENTION

The present invention relates to a stud feeding mechanism adapted to be associated with a tire stud applicator gun and, more particularly, to an improvement in such tire stud feeding mechanism. In the co-pending application of William G. Brosene, Jr. Ser. No. 500,899 filed Oct. 22, 1965, now U.S. Patent No. 3,367,015, there is shown a tire stud feeding mechanism operatively associated with a stud applicator gun. The tire stud feeding mechanism in the co-pending Brosene application includes a hopper for receiving a plurality of studs in random fashion. An elongated slot is provided in the bottom of the hopper for automatically aligning the studs within the hopper so that they may pass outwardly of the hopper into a suitable guide means. Pressurized air is utilized to cause movement of the studs transversely of their normal line of motion from the guide means into a conduit to be delivered to a place of use. Occasional jamming has occurred, and the structure is relatively complex.

The primary object of the present invention is to provide a tire stud feeding mechanism with a simplified arrangement for tilting the studs passing from a hopper into end-to-end relationship in a conduit with the head end first.

Another object of the present invention is to provide an improved stud feeding mechanism comprising a hopper having an elongated slot in the downwardly sloping bottom portion thereof, with a cam track being provided in the hopper adjacent the outlet for engaging the shanks of the aligned and uniformly oriented studs in the elongated slot to tilt the studs for head first entry into conduit means wherein they are disposed in end-to-end relationship for delivery to a point of use. Other objects and advantages of this invention will become more apparent hereinafter.

BRIEF DESCRIPTION OF THE DRAWING

The attached drawing shows a presently preferred form of the invention in which like numerals refer to like elements and in which:

FIG. 1 is a perspective view illustrating a tire stud feeding mechanism embodying the present invention;

FIG. 2 is a longitudinal sectional view of the tire stud feeding mechanism taken generally along the line 2—2 of FIG. 1;

FIG. 3 is a cross sectional view taken generally along the line 3—3 of FIG. 2; and FIG. 4 is a longitudinal sectional view similar to FIG. 2 illustrating the stud feeding mechanism with the plunger in its rear-most position.

DESCRIPTION OF THE PREFERRED EMBODIMENT

Referring now to the drawings, there is shown a tire stud feeding mechanism 10 embodying the present invention. The tire stud feeding mechanism 10 includes a hopper 12 to the side of which is secured a bracket 14 for mounting the hopper on a suitable upright support 16. It will be noted that the hopper 12 is sloped downwardly and forwardly. The tire stud feeding mechanism 10 of the present invention is adapted to be connected with a stud applicator gun by means of the tire stud feeding conduit 18 and is adapted to be connected to a suitable source of gas under pressure through the conduit 20. The stud applicator gun may be utilized for inserting studs into openings provided in the road engaging surface in a tire.

The bracket 14 is suitably secured to the upright support 16 by fastening means including, for example, U-bolts 17. Suitable bolts or machine screws 15 secure the bracket 14 to the hopper 12.

The hopper 12 provides a container for receiving a plurality of studs in a random fashion. The studs, as shown, are of the type having a shank portion with a head or flange portion at one end. The top of the hopper 12 is closed by a cover 22 pivotably secured at one end by a hinge member 24. The hopper 12 includes a front wall 26, a rear wall 28 and side walls 30 and 32 which are so positioned as to converge downwardly toward one another, with the lower portions of the side walls 30 and 32 being spaced apart in parallel relationship for receiving a block member 34 therebetween.

As seen in FIG. 3, there is provided within the block member 34 an elongated slot 38 for receiving the shanks of the tire studs 36 in an aligned, uniformly oriented manner. The slot 38 in the block 34 is so dimensioned as to readily receive the reduced shank portion 36a of each stud, but the slot is not of such a dimension as to receive the enlarged head portion 36b, whereby the studs will be suspended at a predetermined aligned attitude as illustrated in FIGS. 2–4. The enlarged head portions 36b are supported on the upper portion of the block 34, and the shank portions 36a hang downwardly within the slot 38.

Agitating means, indicated generally by the numeral 40 are provided for moving or stirring the tire studs within the hopper 12 so as to assist the tire studs in entering the elongated slot 38 at the desired predetermined attitude.

Referring to FIGS. 2, 3 and 4, it is seen that the agitating means 40 comprises a generally rectangular block member or plunger 42 secured at one end to a rod-like actuator 44 housed within the body 46. The rod or shaft 44 is rigidly secured to the plunger 42 by suitable means, for example, a set screw 48. Spring 49 disposed about the rod 44 urges the plunger 42 to the left as viewed in FIG. 2. The spring 49 is housed between the rod 44 and the sleeve member 50. The enlarged end of the sleeve 50 is adapted to abut against a closure member 52 provided at the right-hand end of body 46 as viewed in FIG. 2. The closure member 52 is retained in place by a retaining ring 54. During operation, the sleeve 50 will be moved from the position shown in FIG. 2 wherein it is in abutment with the closure cap 52 to the position shown in FIG. 4 wherein it is in abutment with a bumper member 56 provided within the body 46.

The rear end of the plunger 42 is provided with a unique configuration to assist in movement of the randomly disposed studs within the hopper and to facilitate entry of the studs 36 into the elongated slot 38 in the block 34 at the bottom of the hopper 12. The rear of the plunger 42 is provided with a recess or cut-out area 59. The forward portion of the cut-out area is defined by a downwardly and forwardly sloping wall or surface 60 of relatively major extent which engages with a downwardly and rearwardly sloping wall or surface 62 of relatively minor extent. The bottom surface of the plunger 42 is generally curved concavely or recessed inwardly as best indicated at 64 in FIG. 3 to accommodate and cooperate with the generally convex curved outer surfaces of the head portions 36b of the tire studs 36.

The cut-out area 59 at the rear of the plunger 41 is constructed and arranged so as to engage with the randomly disposed stud within the hopper 12 and to jar and agitate the studs 36 so as to position them with the shank portions 36a depending into the elongated slot 38 in the bottom of hopper 12 so as to present the studs in a predetermined manner in the elongated slot 38. Since the hopper bottom is normally at a downwardly inclined angle with respect to the horizontal, as best seen in FIG. 1, the studs will slide or more forwardly in the elongated slot 38 after reaching the aligned position therein.

Provided in the hopper adjacent the forward end of the elongated slot 38 is a cam track means 70 defined by an upwardly and forwardly inclined surface in the block 34. Upon engaging the cam surface, the studs 36 are each tilted so that the head end thereof will move first into the conduit means. The conduit means includes a tubular member or conduit extension 19 retained within the body 46 in abutting relationship at one end with the block 34 and which communicates at the other end with a flexible tube-like member 18 that is connected at its other end to the stud applicator gun. The studs 36 are disposed in the conduit in end-to-end abutting relationship, with the head end entering the conduit first so that the studs 36 can enter and be discharged first from the stud gun so as to be at a proper attitude for insertion into a tire.

It will be noted that there is no movement of the studs transversely of the block 34 or of the conduit means 18 as they are discharged from hopper 12. The studs 36 move in a straight line from the slot 38 in the block 34, are tilted by the cam track means 70 so as to move head first into the conduit extension 19 of conduit means 18 and then be aligned in end-to-end relationship within the conduit means 18. The air conduit 20 may communicate with the conduit means 18 to assist the movement of the studs 36 within the conduit from the hopper 12 to a point of use.

While I have shown a preferred embodiment of the present invention, it will be understood by those skilled in the art that the invention is not so limited, since it may be otherwise embodied within the scope of the following claims:

What is claimed is:

1. In a stud feeding device comprising a hopper for receiving a plurality of studs disposed in random fashion therewithin, each of said studs having a shank portion and an enlarged head portion at one end of said shank portion, said hopper having a bottom portion sloping downwardly toward a lower forward outlet portion through which studs are adapted to be discharged from the hopper, an elongated slot formed in the bottom portion of said hopper, agitating means operatively associated with said hopper and movably mounted with respect thereto for aligning studs in the elongated slot for discharge through said forward outlet portion, and conduit means adjacent said outlet portion for receiving aligned studs passing outwardly of the hopper, said elongated slot being wide enough to receive the shanks of the studs and smaller than the diameter of the heads of the studs to hold the studs in a predetermined aligned attitude, said improvement comprising cam track means in the hopper for engaging the shanks of the aligned uniformly oriented studs in the elongated slot to tilt the studs for end-to-end head-first entry into said conduit means, said elongated slot being deeper than the shanks of the studs over a portion of the slot and said cam track means being adjacent to the forward end of the slot and being comprised of a raised surface positioned to engage the shank, said conduit means being adjacent said cam track means for receiving studs headfirst.

2. A device as in claim 1 wherein the inlet to the conduit means is aligned axially with the elongated slot, whereby the studs move along a line from the elongated slot into the conduit means.

3. A device as in claim 1 wherein the forward end of the slot is provided with cam track means which defines the bottom of the slot over a portion of its length, said cam track means including an upwardly inclined surface portion adapted to engage the shank of a stud so as to tilt the stud head first into said conduit means.

4. A device as in claim 1 wherein said agitating means comprises a plunger reciprocably slidable in said hopper over said elongated slot, said plunger having a cut-out portion in the rear thereof including a downwardly and rearwardly sloping wall for facilitating entry of the studs in the hopper into said elongated slot.

5. A device as in claim 4 wherein the bottom of the plunger is curved concavely to accommodate and cooperate with the stud heads.

References Cited

UNITED STATES PATENTS 2,427,712 9/1947 Casler.
3,266,613 8/1966 Grafius _____ 193—43

RICHARD E. AEGERTER, Primary Examiner

U.S. Cl. X.R.

221—175